(12) United States Patent
Koishi

(10) Patent No.: US 8,345,189 B2
(45) Date of Patent: Jan. 1, 2013

(54) DIFFRACTIVE DISPLAY DEVICE, FINDER DEVICE AND CAMERA

(75) Inventor: Hiroyuki Koishi, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/420,617

(22) Filed: Mar. 15, 2012

(65) Prior Publication Data

US 2012/0169911 A1 Jul. 5, 2012

Related U.S. Application Data

(63) Continuation of application No. 12/444,552, filed as application No. PCT/JP2007/069599 on Oct. 5, 2007, now Pat. No. 8,164,714.

(30) Foreign Application Priority Data

Oct. 6, 2006 (JP) .................................. 2006-274951

(51) Int. Cl.
*G02F 1/1333* (2006.01)
(52) U.S. Cl. ......................................................... 349/86
(58) Field of Classification Search ........................ None
See application file for complete search history.

(56) References Cited

U.S. PATENT DOCUMENTS

| | | | |
|---|---|---|---|
| 5,099,343 A | 3/1992 | Margerum et al. | |
| 6,002,887 A | 12/1999 | Chiba et al. | |
| 7,542,669 B2 | 6/2009 | Koishi | |
| 2001/0033480 A1 | 10/2001 | Wakabayashi et al. | |
| 2005/0036780 A1* | 2/2005 | Iwane | 396/111 |
| 2006/0034603 A1 | 2/2006 | Homma | |
| 2006/0263079 A1 | 11/2006 | Koishi | |
| 2010/0097564 A1* | 4/2010 | Koishi | 349/196 |

FOREIGN PATENT DOCUMENTS

| | | |
|---|---|---|
| JP | 03-073926 | 3/1991 |
| JP | 2001-296596 | 10/2001 |
| JP | 2001-318367 | 11/2001 |
| JP | 2004-191415 | 7/2004 |
| JP | 2006-154506 | 6/2006 |
| JP | 2006-330103 | 12/2006 |

OTHER PUBLICATIONS

International Search Report for corresponding International Application No. PCT/JP2007/069599, Nov. 20, 2007.

* cited by examiner

*Primary Examiner* — Sung Pak
(74) *Attorney, Agent, or Firm* — Ditthavong Mori & Steiner, P.C.

(57) ABSTRACT

A diffractive display device includes a first substrate, a second substrate, first illuminating means, second illuminating means, and an optical material layer. The optical material layer includes a first portion and a second portion. The first portion includes a first diffraction display section in which first refractive index isotropic regions and first refractive index anisotropic regions are inclined with respect to the output surface of the first substrate. The second portion includes a second diffraction display section in which second refractive index isotropic regions and second refractive index anisotropic regions are inclined with respect to the output surface of the first substrate.

20 Claims, 6 Drawing Sheets

DIFFRACTIVE DISPLAY DEVICE, FINDER DEVICE AND CAMERA

CROSS-REFERENCE TO RELATED APPLICATIONS

The present application is a continuation application of the U.S. patent application Ser. No. 12/444,552 filed Apr. 6, 2009, which in turn is a national stage application of International Application No. PCT/JP2007/069599, filed Oct. 5, 2007, which claims priority to Japanese Patent Application No. 2006-274951, filed on Oct. 6, 2006. The contents of these applications are incorporated herein by reference in their entirety.

BACKGROUND OF THE INVENTION

1. Field of the Invention

The present invention relates to a diffractive display device, and a finder device and a camera.

2. Discussion of the Background

There have conventionally been known intrafinder display devices making a display within a finder scope of a camera by superimposing a variety of information such as a focus detection area on an object image, a so-called superimposed display. Among these intrafinder display devices, for example as shown in later-described Patent Document 1, a diffractive display device capable of displaying a liquid crystal hologram has been developed.

In the diffractive display device shown in this Patent Document 1, an optical material layer is sealed within a transparent substrate, and this optical material layer forms a refractive index grating having a periodical layer configuration made up of refractive index isotropic regions and refractive index anisotropic regions within a polymer distributed liquid crystal. When illumination light is entered from the side surface of the optical material layer between the substrates, the light is diffracted by the refractive index grating of the optical material layer and emitted from the surface of the transparent substrate in a pentaprism direction, and letters and graphics formed by the diffraction light can be observed as intrafinder displays.

Typical examples of the conventional intrafinder displays include a mark display of a focus detection area or the like. Recently, there are cases where mark displays of a plurality of focus detection areas are desired to be made.

However, in the diffractive display device, for example as shown in Japanese Unexamined Patent Publication No 2004-191415, when a plurality of mark displays are intended to be made within the finder scope, luminance of diffraction light decreases depending upon positions of the mark displays, which might cause occurrence of non-uniformity of luminance within the surface.

Further, an attempt has also been made recently to increase a cell size of the diffractive display device, and when the cell size is increased, a problem of attenuation of light after entering into the optical material layer occurs, and especially luminance of a mark display located on the opposite side to the light entering surface tends to decrease.

SUMMARY OF THE INVENTION

According to one aspect of the present invention, a diffractive display device includes a first substrate, a second substrate, first illuminating means for entering light through a side surface of the first and second substrates, second illuminating means for entering light through the side surface of the first and second substrates from a direction different from the light from the first illuminating means, and an optical material layer provided between the first and second substrates. The optical material layer includes a first portion and a second portion. The first portion is provided to diffract the light from the first illuminating means to emit the light through an output surface of the first substrate. The first portion includes a first diffraction display section in which first refractive index isotropic regions and first refractive index anisotropic regions are inclined with respect to the output surface of the first substrate. The second portion is provided to diffract the light from the second illuminating means to emit the light through the output surface of the first substrate. The second portion includes a second diffraction display section in which second refractive index isotropic regions and second refractive index anisotropic regions are inclined with respect to the output surface of the first substrate.

According to another aspect of the present invention, a diffractive display device includes a first substrate, a second substrate, a first light source configured to emit light through a side surface of the first and second substrates, a second light source configured to emit light through the side surface of the first and second substrates from a direction different from the light from the first light source, and an optical material layer provided between the first and second substrates. The optical material layer includes a first portion and a second portion. The first portion is provided to diffract the light from the first light source to emit the light through an output surface of the first substrate. The first portion includes a first diffraction display section in which first refractive index isotropic regions and first refractive index anisotropic regions are inclined with respect to the output surface of the first substrate. The second portion is provided to diffract the light from the second light source to emit the light through the output surface of the first substrate. The second portion includes a second diffraction display section in which second refractive index isotropic regions and second refractive index anisotropic regions are inclined with respect to the output surface of the first substrate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
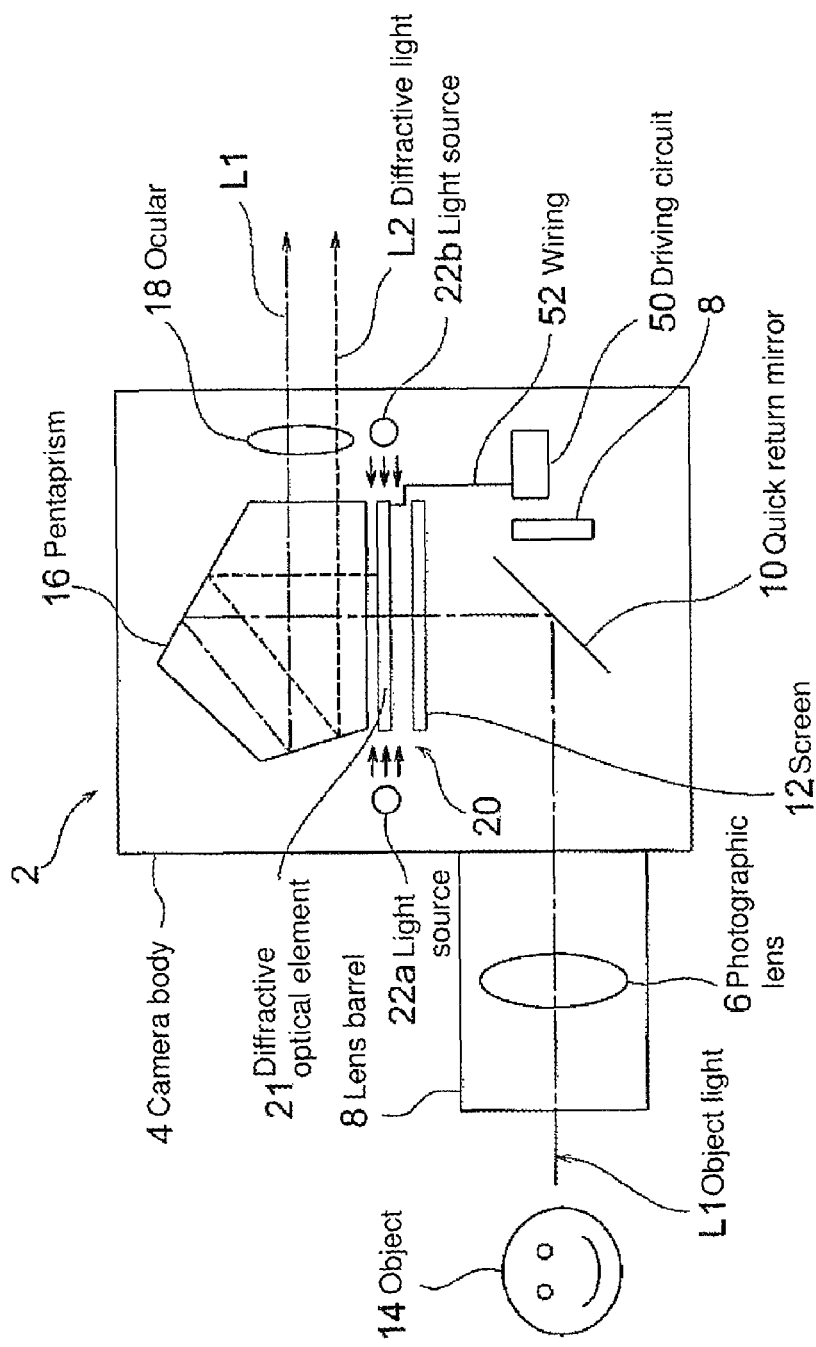
FIG. 1 is a schematic view of a camera having a finder device with a diffractive display device according to an embodiment of the present invention built therein.

The embodiments will now be described with reference to the accompanying drawings, wherein like reference numerals designate corresponding or identical elements throughout the various drawings.

In the following, the present invention is described based upon embodiments shown in the drawings.

First Embodiment

As shown in FIG. 1, a single lens reflex camera 2 according to an embodiment of the present invention has a camera body 4, and the camera body 4 is exchangeably equipped with a lens barrel 8 provided with a photographic lens 6. As the single lens reflex camera 2 employed may be a film camera using a silver film as a recording medium 8 or a single lens digital camera using an image pickup device such as a CCD or a CMOS as the recording medium 8.

A quick return mirror 10, which reflects object light L1 from an object 14 on a finder optical system, is installed between the photographic lens 6 and the recording medium 8. It is to be noted that, although not shown, a shutter is provided between the recording medium 8 and the quick return mirror 10.

A finder screen 12 is arranged in a position optically conjugated with an image formation surface of the recording medium 8, and the object light L1 from the object 14 is reflected on the quick return mirror 10, and an image is formed on the finder screen 12. The object image formed on the finder screen 12 can be observed by a person who looks into the finder through a pentaprism 16 and an ocular 18. It should be noted that at the time of photographing, the quick return mirror 10 is shifted off a light path of the object light L1, and the object image is formed on the recording medium 8 by the photographic lens 6.

A finder device is built within the camera body 4. The finder device has the finder screen 12, the pentaprism 16 and the ocular 18. Within the finder device, a diffractive optical element 21 of a diffractive display device 20 is arranged adjacently to the finder screen 12.

At both sides of the diffractive optical element 21, a first light source 22a and a second light source 22b for separately illuminating the diffractive optical element 21 are arranged as opposed to each other. As these light sources 22a, 22b, for example, an LED or the like is used. It is to be noted that the first light source 22a and the second light source 22b, divided from the same light source by means of an optical fiber or the like, may be used.

As described later, the diffractive optical element 21 is a diffractive optical element that has a display section using the refractive index grating. Light entered from the first light source 22a and the second light source 22b into the diffractive optical element 21 is diffracted in a direction of the pentaprism 16 by the refractive index grating based upon control by a driving circuit 50 having been connected to the diffractive optical element 21 through the wiring 52. The diffractive optical element 21 displays a mark of prescribed information such as a focus detection area within the finder scope by means of a display section configured of the refractive index grating.

Diffractive light L2 emitted from the diffractive optical element 21 within the finder device is reflected by means of the pentaprism 16, and observed through the ocular 18 by a photographer as the prescribed information. Consequently, the prescribed information is displayed within the finder scope as superimposed on the foregoing object image, making it possible for the photographer to simultaneously observe the object image and the prescribed information, and making a so-called superimposed display possible.

Figure 2:
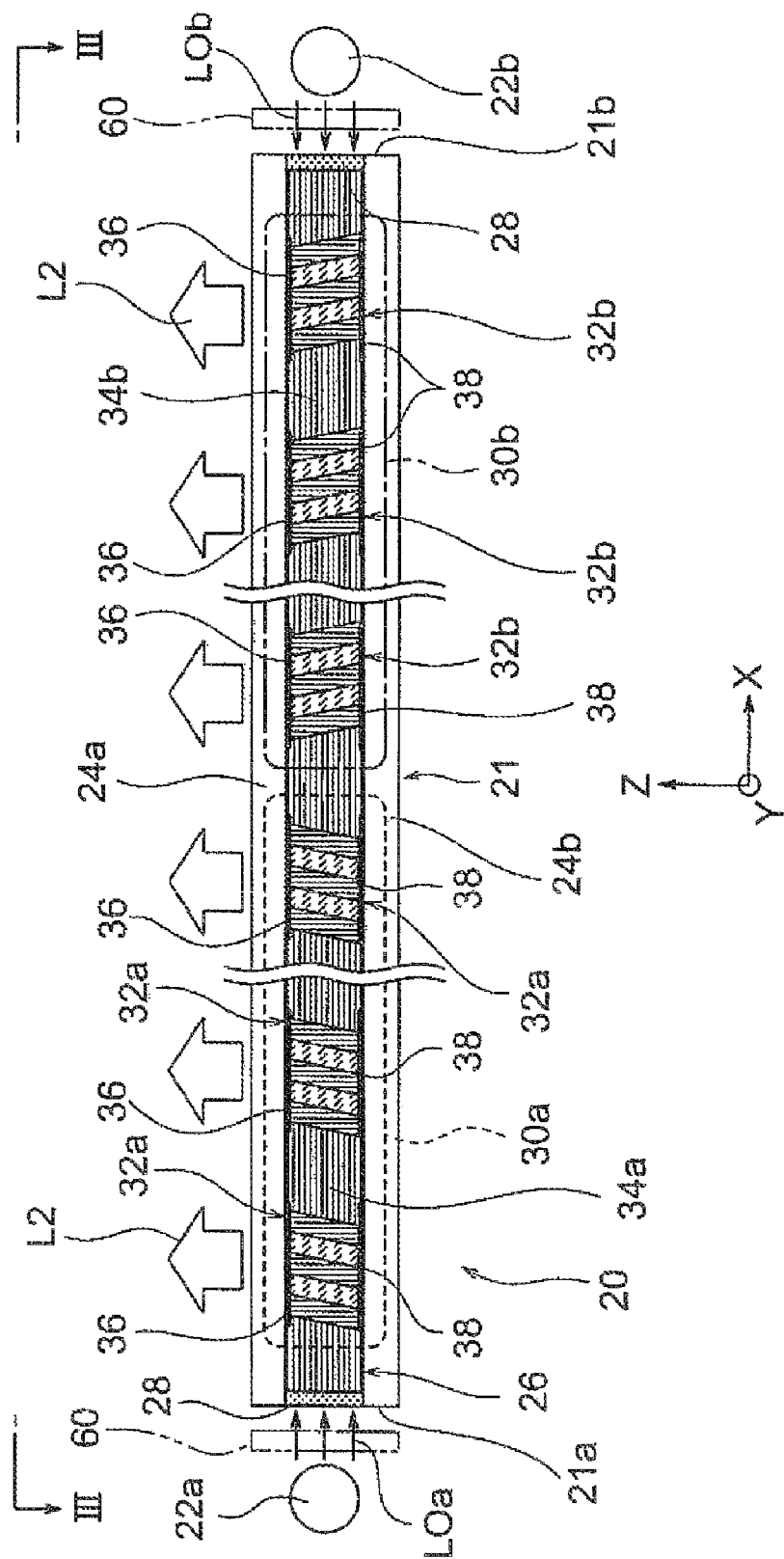
FIG. 2 is a sectional view of the diffractive display device shown in FIG. 1.
Figure 3:
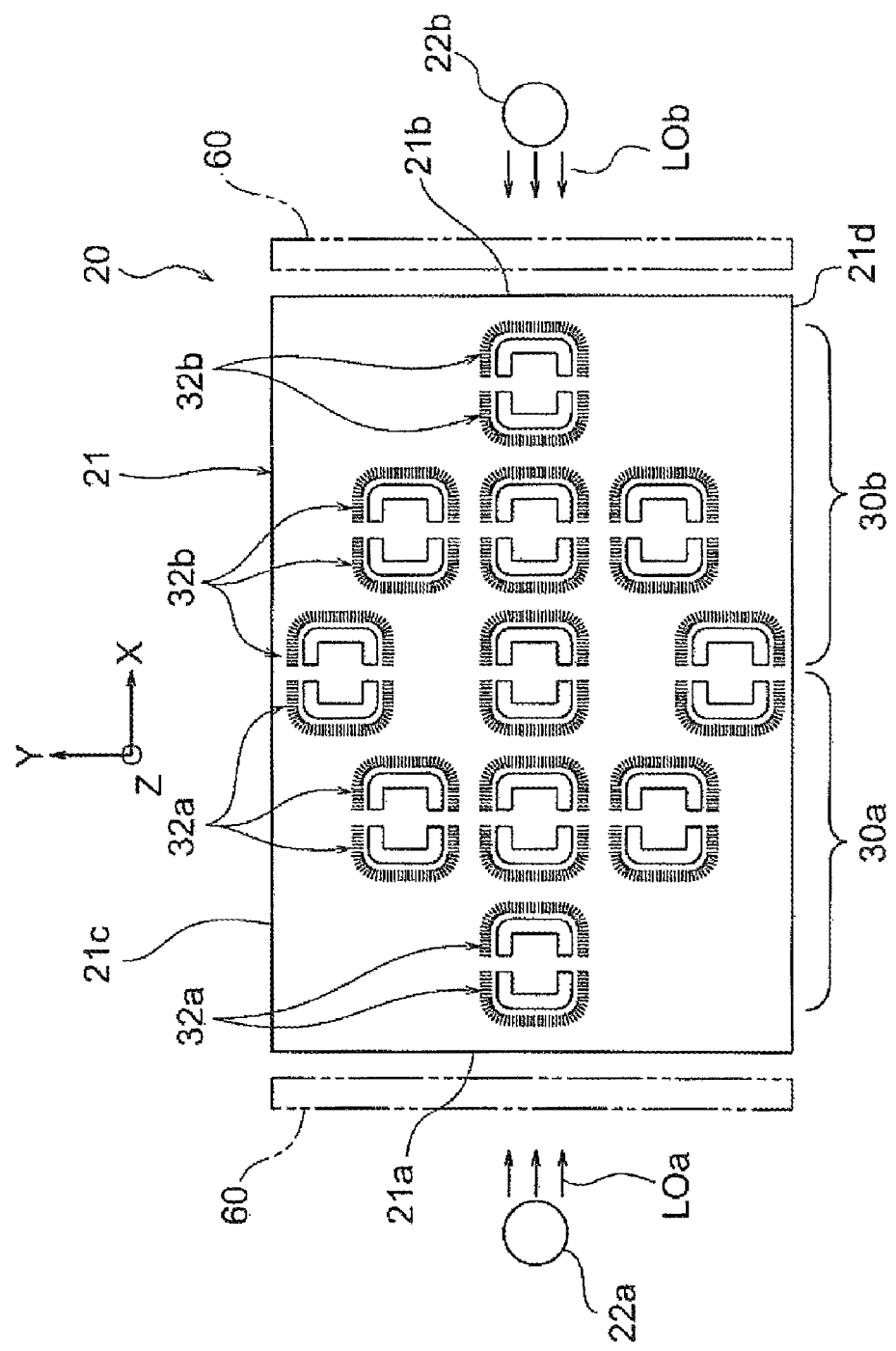
FIG. 3 is a plan schematic view along line III-III of the diffractive display device shown in FIG. 2.

Next, the diffractive display device 20 installed within the finder device of the camera 2 is described. As shown in FIGS. 2 and 3, the diffractive display device 20 of the present embodiment has the diffractive optical element 21 in a rectangular flat plate shape, and the first light source 22a and the second light source 22b respectively arranged in the vicinity of positions of short-side surfaces of the element 21, which are opposed to each other in a longitudinal direction X of this diffractive optical element 21 having the rectangular flat plate shape.

Optical filters 60 may be respectively arranged between the first light source 22a and a short-side surface 21a of the element 21 and between the second light source 22b and a short-side surface 21b of the element 21. The optical filter 60 of the present embodiment is described later as another embodiment.

As shown in FIG. 2, the element 21 has a transparent first substrate 24a and an equally transparent second substrate 24b. These substrates 24a and 24b are constituted, for example, of glass substrates. An optical material layer 26 is formed between the pair of substrates 24a and 24b, and this optical material layer 26 is sealed by a transparent sealing member 28 connected so as to seal peripheral edges of both the substrates 24a and 24b, The optical material layer 26 includes: a first portion 30a located on a side closer to the first light source 22a (or a side closer to the side surface of the diffractive optical element 21 through which the first light source 22a is entered) than the second light source 22b (or the side surface of the diffractive optical element 21 through which the second light source 22b is entered); and a second portion 30a located on the side closer to the second light source (or a side closer to the side surface of the diffractive optical element 21 through which the second light source 22b is entered) than the first light source 22a (or the side surface of the diffractive optical element 21 through which the first light source 22a is entered). In FIG. 3, on the screen of the element 21, the left half is the first portion 30a, and the right half is the second portion 30b.

First display sections 32a and first non-display sections 34a are arranged in the first portion 30a. Second display sections 32b and second non-display sections 34b are also arranged in the second portion 30b. As shown in FIG. 3, the first display sections 32a and the second display sections 32b are arranged in an axisymmetric relation when seen from the screen of the element 21.

Display sections 32a, 32b and non-display sections 34a, 34b are respectively arranged in the first portion 30a and the second portion 30b. As conceptually shown in FIG. 4, in the respective display sections 32a, 32b, a first transparent electrode 36 and a second transparent electrode 38 are formed on the opposing inner surfaces of the respective substrates 24a, 24b.

In this embodiment, these opposing transparent electrodes 36, 38 are formed in an identical shape, having a shape in accordance with display forms (letters and graphics) of the display sections 32a, 32b. In this embodiment, as shown in FIG. 3, the display forms of the display sections 32a, 32b are substantially C-shaped, and the adjacent display sections 32a, 32b are mutually opposed with a small spacing therebetween so that a pair of display sections 32a, 32b constitutes a ring shape. These transparent electrodes 36, 38 are connected to the foregoing driving circuit 50 shown in FIG. 1, and a voltage to be applied between the transparent electrodes 36, 38 is applied and controlled by the driving circuit 50.

It is to be noted that either the transparent electrode 36, 38 can be a common electrode, and may be formed over the inner surface of either the substrates 24a, 24b.

The optical material layer 26 is made up of polymer distributed liquid crystal, and the non-display sections 34a, 34b not provided with the transparent electrodes 36, 38 for display are cured and dispersed in a mixed state of a material (polymer) having a refractive index isotropy and a material (liquid crystal) having a refractive index anisotropy.

Figure 4:
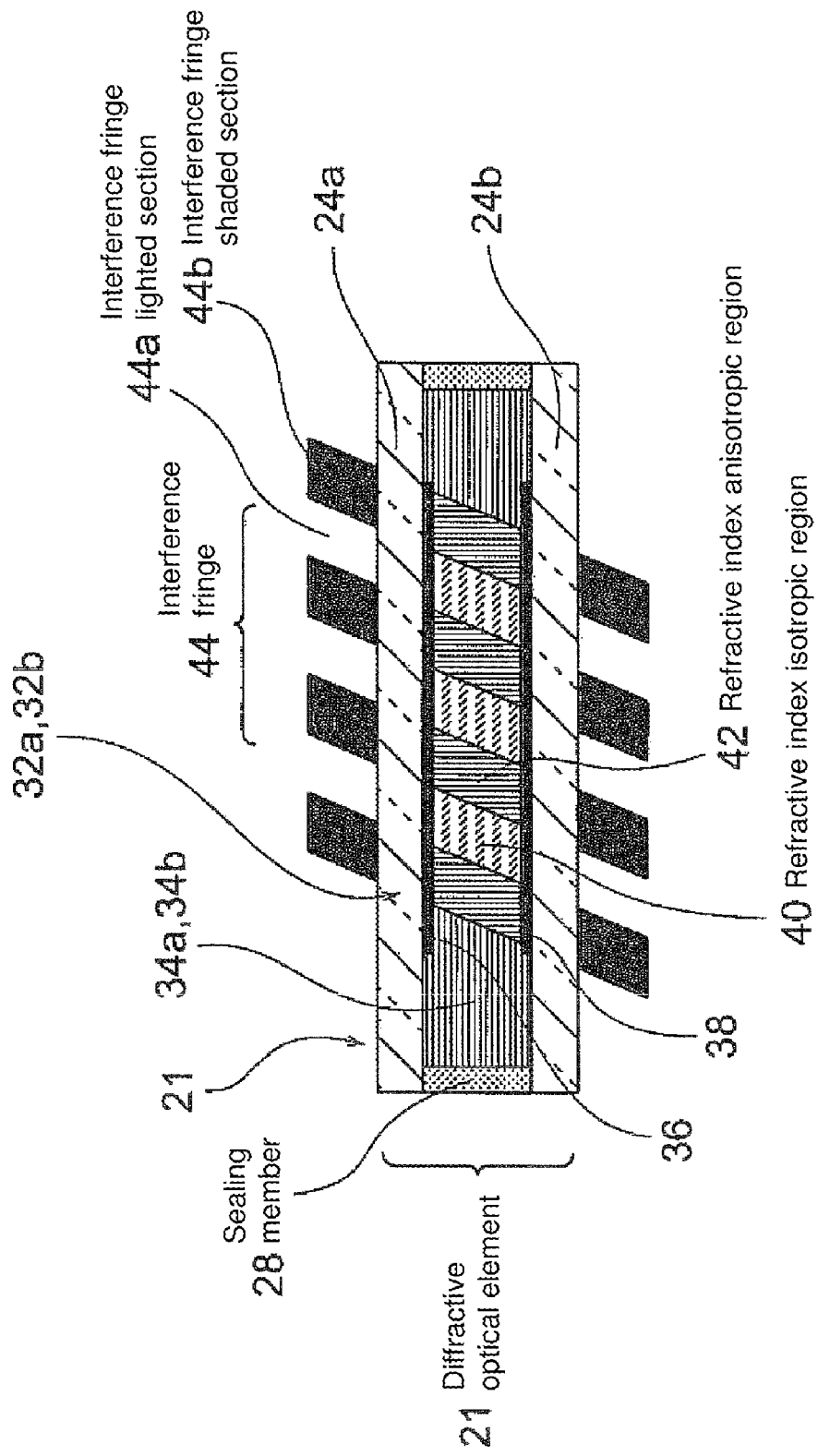
FIG. 4 is a schematic view showing an example of manufacturing of the diffractive display device shown in FIG. 2.

Meanwhile, the display sections 32a, 32b sandwiched between the transparent electrodes 36, 38 are portions of liquid crystal hologram and, as shown in FIG. 4, form a banded multi-layered configuration in which refractive index isotropic regions 40 and refractive index anisotropic regions 42 are alternately repeated along the plane surface of the diffractive optical element 21, and further, in traveling directions of illumination light from the respective light source 22a or 22b. The refractive index isotropic region 40 is a region in which the foregoing polymer monomer has been cured to be polymer, and in the refractive index anisotropic region 42, liquid crystal as the refractive index anisotropic material is dispersed in the cured polymer.

In order to form the multi-layered configuration shown in FIG. 4, interference fringes 44 are formed using laser light or the like, and in the regions where the interference fringes 44 have been formed, the liquid crystal substrate in a mixed state of the monomer and the liquid crystal is installed in the regions. At this time, masks are formed on the substrates 24a, 24b such that the interference fringes 44 are not formed in the non-display sections 34a, 34b. Monomer is cured by photopolymerization, and at this time, a layer of polymer obtained by curing monomer is formed in the interference fringe lighted sections 44a where optical intensity has become stronger due to the interference.

On the contrary, since a photopolymerization rate in the interference fringe shaded sections 44b having weak optical intensities is lower than a photopolymerization rate in the interference fringe lighted sections 44a, the density of the liquid crystal becomes higher in amount equivalent to monomer having been drawn to a region with a high optical intensity (portion at a high photopolymerization rate). Consequently, the multi-layered laminating configuration of the refractive index isotropic regions 40 made up of polymer and the refractive index anisotropic regions 42 made up of polymer with high liquid crystal density is formed in the same pattern as the interference fringes 44. Repeated pitch interval of the multi-layered laminating configuration of the refractive index isotropic regions 40 and the refractive index anisotropic regions 42 is on the order of about 100 nm.

While a voltage can be applied to the transparent electrodes 36, 38 provided so as to sandwich the display sections 32a, 32b by the driving circuit 50 (cf. FIG. 1) as described above, the refractive index isotropic region 40 made up of polymer has an anisotropic refractive index regardless of whether or not a voltage has been applied. On the other hand, in the refractive index anisotropic region 42 with liquid crystal dispersed in the polymer, an orientation of the liquid crystal changes in accordance with whether or not a voltage has been applied, and based thereupon, a refractive index also changes.

In a state where a voltage has not been applied to the transparent electrodes 36, 38, different refractive index values are taken as the refractive index of the liquid crystal and the refractive index of the polymer so as to satisfy the Bragg's condition of diffraction with respect to light entered into the display sections 32a, 32b toward the lamination direction as the illumination light from the respective light sources 22a, 22b. Namely, in the state where a voltage has not been applied, a refractive index grating in which layers with a large refractive index and layers with a small refractive index are alternately arrayed is formed in each of the display sections 32a, 32b.

The diffraction condition at this time is set such that only first illumination light L0a, which enters from the first light source 22a into the optical material layer 26 through the short side surface 21a of the element 21 and travels in the positive direction of the X-axis, is diffracted in the first display section 32a, and the diffractive light L2 is diffracted in the direction of the pentaprism 16 shown in FIG. 1 (the positive direction of the Z-axis in FIGS. 2 and 3).

On the other hand, in the first portion 30a, in a state where a voltage has been applied, the orientation of the liquid crystal within the refractive index anisotropic region 42 changes along with a change in refractive index, and the refractive index of the liquid crystal becomes equivalent to the refractive index of the polymer. Consequently, the illumination light L0a, which enters from the first light source 22a into the optical material layer 26 and travels in the positive direction of the X-axis, transmits through the first display section 32a without being diffracted in the first display section 32a. It should be noted that in the second portion 30b, the first illumination light L0a from the first light source 22a, having transmitted through the first display section 32a and traveling in the positive direction of the X-axis, transmits through the second display section 32b without being diffracted regardless of application or non-application of a voltage between the transparent electrode 36 and 38.

Further, in the state where a voltage has not been applied between the transparent electrodes 36 and 38, it is set such that only a second illumination light L0b, which enters from the second light source 22b into the optical material layer 26 through the short side surface 21b of the element 21 and travels in the negative direction of the X-axis, is diffracted in the second display section 32b, and the diffractive light L2 is diffracted in the direction of the pentaprism 16 shown in FIG. 1 (the positive direction of the Z-axis in FIGS. 2 and 3).

On the other hand, in the second portion 30b, in the state where a voltage has been applied, the refractive index changes along with a change in orientation of the liquid crystal within the refractive index anisotropic region 42, and the refractive index of the liquid crystal becomes equivalent to the refractive index of the polymer. Consequently, the second illumination light L0b, which enters from the second light source 22b into the optical material layer 26 and travels in the negative direction of the X-axis, transmits through the second display section 32b without being diffracted in the second display section 32b. It should be noted that in the first portion 30a, the second illumination light L0b from the second light source 22b, having transmitted through the second display section 32b and traveling in the negative direction of the X-axis, transmits through the first display section 32a without being diffracted regardless of application or non-application of a voltage between the transparent electrodes 36 and 38.

It should be noted that in the foregoing description, the positive direction of the X-axis is a direction from the first light source 22a toward the second light source 22b, and the negative direction of the X-axis is reverse thereto. Further, the positive direction of the Z-axis is a direction in which diffractive light is emitted in a substantially vertical direction from the screen surface of the substrate 24a, and the negative direction of the Z-axis is reverse thereto. A Y-axis is in a direction that is vertical to both X- and Z-axes.

FIGS. 2 and 3 show the states where a voltage has not been applied between the transparent electrodes 36 and 38 both in the first portion 30a and the second portion 30b, and in the first display section 32a in the first portion 30a, only the first illumination light L0a from the first light source 22a is diffracted to create the diffractive light L2. Further, simultaneously, in the second display section 32b in the second portion 30b, only the second illumination light L0b from the second light source 22b is diffracted to create the diffractive light L2. Marks corresponding to the display sections 32a, 32b shown in FIG. 3 are displayed by the diffractive light L2 shown in FIG. 2.

In the state where a voltage has been applied between the transparent electrode 36 and 38, in both the first portion 30a and the second portion 30b, no diffractive light L2 is formed and no mark displays corresponding to the display section 32a and 32b shown in FIG. 3 are formed in both the display section 32a and 32b.

As a method for diffracting only the first illumination light L0a while not diffracting the second illumination light L0b in the first display section 32a in the first portion 30a, and performing reversal diffraction thereto in the second display section 32b in the second portion 30b in the state where a voltage is not applied between the transparent electrodes 36 and 38, for example, a method shown below can be considered. Namely, the interference fringes 44 shown in FIG. 4 may be formed from different directions between the first portion 30a and the second portion 30b.

When the voltage application to the transparent electrodes 36 and 38 sandwiching the display sections 32a, 32b is turned off, the laminating configuration section functions as the refractive index grating as described above, and as shown in FIG. 2, the illumination light L0a, Lob from the respective light sources is diffracted in the respective display sections 32a, 32b to become the diffractive light L2, and is emitted from the surface of the substrate 24a in a substantially vertical direction. As shown in FIG. 1, the diffractive light L2 gets into the eyes of the photographer looking into the finder, through the pentaprism 16 and the ocular 18.

Consequently, the photographer can observe the object light L1 from the object 14 superimposed with the diffractive light L2 corresponding to the display sections 32a, 32b. On the other hand, when the voltage application to the transparent electrodes 36 and 38 is turned on, all illumination light L0a, L0b transmits the respective display sections 32a, 32b without being diffracted in the laminating portions of the regions 40 and 42. Therefore, the diffractive light L2 is not led to the ocular 18 (cf. FIG. 1), and only the object image is observed by the photographer.

It is to be noted that the object light L1 entered from the quick return mirror 10 side naturally transmits portions other than the first display sections 32a and the second display sections 32b both in the first portion 30a and the second portion 30b, and is emitted to the pentaprism 16 side. Further, in either cases where a voltage has been applied to the corresponding transparent electrode or where a voltage has not been applied thereto in either the first display section 32a or the second display section 32b, the object light L1 entered from the quick return mirror 10 side transmits through the first display section 32a or the second display section b and is emitted to the pentaprism 16 side. When a voltage is not applied, in the first display section 32a and the second display section 32b, the light from the first light source 22a or the second light source 22b is diffracted to the pentaprism 16 side and emitted along with the object light L1, and hence the object light superimposed with marks is observed by the photographer.

In the present embodiment, the optical material layer 26 capable of displaying a hologram by means of diffraction of light is divided into two or more portions which are the first portion 30a and the second portion 30b, and the respective portions are reacted with and diffract only the illumination light L0a, L0b from specific directions. The first light source 22a is arranged close to the first portion 30a, and the second light source 22b is arranged in the second portion 30b. Consequently, the first portion 30a diffracts only the first illumination light L0a and emits the same from the surface of the first substrate 24a, and the second portion 30b diffracts only the second illumination light L0b and emits the same from the surface of the first substrate 24a.

Therefore, even when a cell size of the diffractive optical element 21 (size of a display screen) becomes larger, or when a large number of displays are made within the range of the display screen, non-uniformity of luminance of mark displays corresponding to the display sections 32a, 32b within the surface is reduced, and further an absolute value of the luminance improves.

Second Embodiment

This embodiment is the same as the first embodiment except that the optical filter 60 is arranged between the respective light sources 22a, 22b and the short side surface 21a of the element 21 as shown in FIGS. 2 and 3. In this embodiment, the optical filter 60 is a polarization plate, and is a polarization converting element that converts light from each of the light sources 22a, 22b into linearly polarized light. The illumination light L0a, L0b emitted from the respective light sources 22a, 22b is converted into linearly polarized light, and entered from the side surfaces 21a, 21b into the optical material layer 26 within the element 21.

Next, the function of this optical filter 60 is described with reference to FIGS. 5A and 5B. FIG. 5 schematically shows the state of liquid crystal in portions in the non-display sections 34a, 34b (cf. FIGS. 2 and 3) of the element 21, where FIG. 5A is a sectional view and FIG. 5B is a sectional view along line VB-VB of FIG. 5A.

As described above, the non-display sections 34a, 34b are in a state where a material (polymer) having a refractive index isotropy and a material (liquid crystal) having a refractive index anisotropy are mixed in a cured condition, and liquid crystal molecules 60 are dispersed in the polymer. It is assumed that illumination light is entered from the left sides of FIGS. 5A and 5B.

Figure 5A:
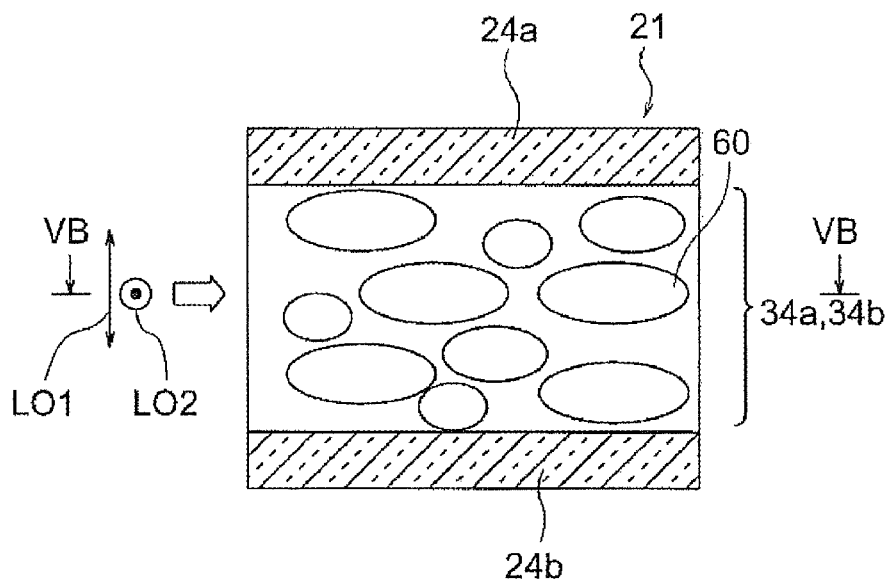
FIG. 5A is a sectional view of an optical material layer showing a function of an optical filter.

As in the sectional view of FIG. 5A, the liquid crystal molecules 60 are layered in a lying state in a narrow range sandwiched between the substrates 24a, 24b. It is to be noted that in a strict sense, some molecules 60 are not layered and slightly inclined since an orientation film is not used in the element 21 of the present embodiment, but the molecules 60 are schematically layered.

Figure 5B:
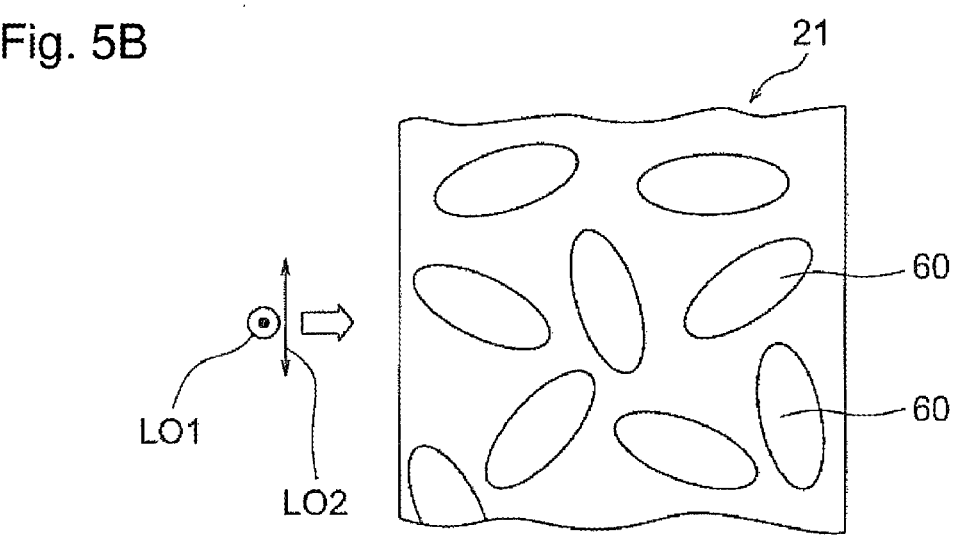
FIG. 5B is a sectional view along line VB-VB shown in FIG. 5A.

Meanwhile, as in the sectional view of FIG. 5B, when the element 21 is seen from the above of the substrate, the orientations of the liquid crystal molecules 60 (orientations of optical axes of the liquid crystal molecules) are random.

A case is considered in which linearly polarized light as denoted by a symbol L01 is entered from the side surface of the element 21 with the orientations of the liquid crystal molecules 60 being in such a state as in FIG. 5. Since the liquid crystal molecules 60 are lying, the probability is high that the refractive index of the liquid crystal will take a fixed value with respect to linearly polarized light vertical to the substrates 24a, 24b as is the linearly polarized light L01. This reduces the possibility that the linearly polarized light L01 will be scattered in the non-display sections 34a, 34b. Meanwhile, since the orientations of the liquid crystal molecules 60 are random with respect to the linearly polarized light L02 in parallel to the substrate, the refractive index of the liquid crystal takes a variety of values, thereby increasing the possibility that the light will be scattered in the non-display sections 34a, 34b.

Therefore, in the present embodiment, as shown in FIGS. 2 and 3, the optical filters 60 that transmit polarized light in a direction vertical to the substrates are installed between the light sources 22a, 22b and the element 21. Since only the linearly polarized light L01 vertical to the substrates 24a, 24b is entered into the element 21, the possibility for scattering of illumination is low in the non-display sections 34a, 34b. This results in improvement in contrast of the display sections 32a, 32b and the non-display sections 34a, 34b.

Further, since the linearly polarized light L01 is parallel to the directions of the optical axes of the liquid crystal molecules when a voltage is applied to the transparent electrodes 36, 38 shown in FIG. 2, it is possible to enhance the diffraction efficiency of the diffractive light L2 emitted from the element 21 so as to further improve the contrast.

It is to be noted that, although the illumination light being the linearly polarized light component is produced by means of the light sources 22a, 22b and the optical filter 60 in the foregoing embodiment, a variety of illumination means can be used so long as being one that produces such illumination light. For example, as the optical element for converting the illumination light into the linearly polarized light L01, a polarization-selective hologram may be used in place of the optical filter 60 made up of an absorption-type polarization plate.

Third Embodiment

Figure 6:
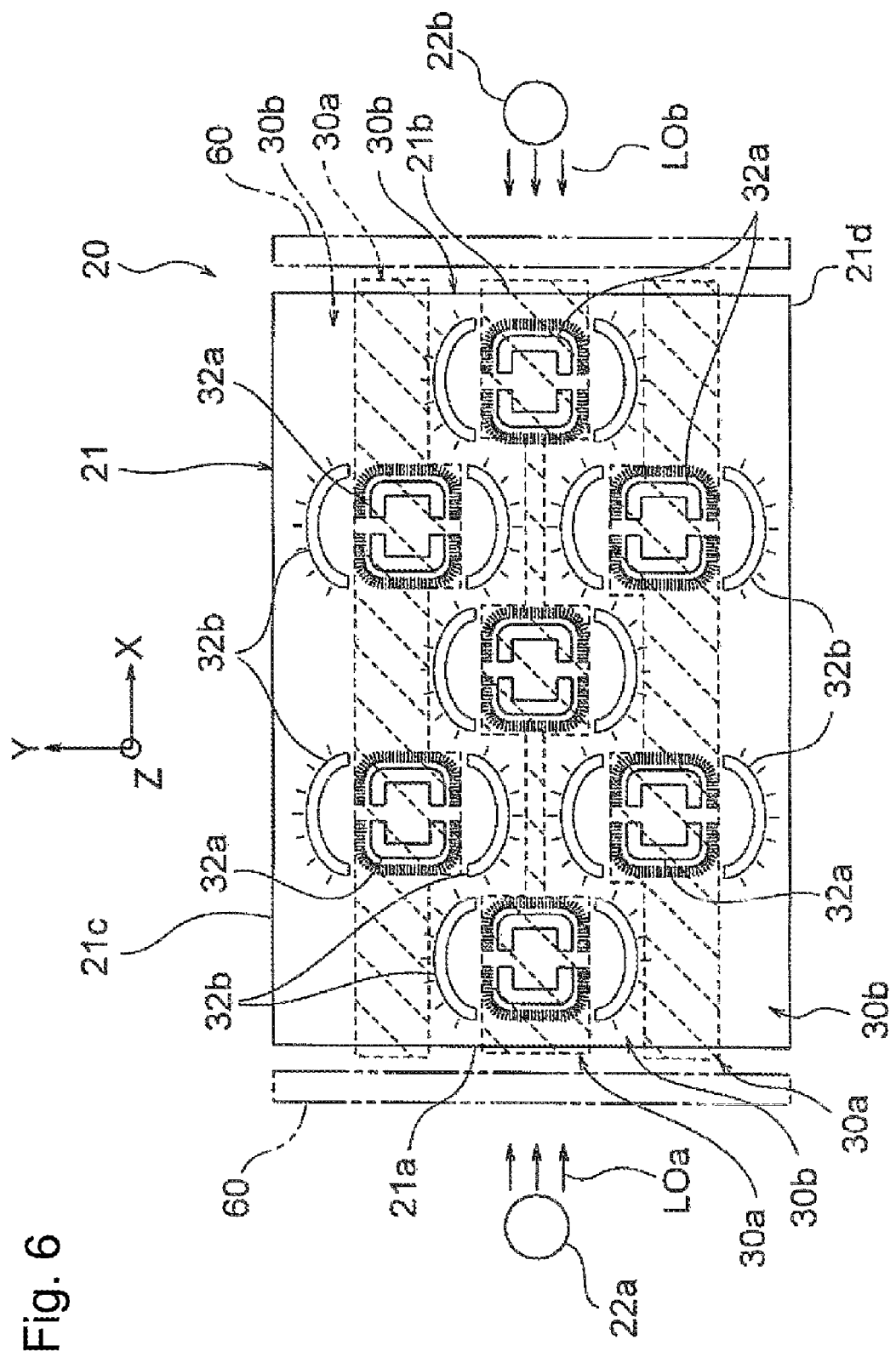
FIG. 6 is a plan schematic view of a diffractive display device according to a third embodiment of the present invention.

In this embodiment, as shown in FIG. 6, the first portion 30a in which the first display sections 32a are formed and the second portion 30b in which the second display sections 32b are formed are alternately repeated in the Y-direction. In this case, the mark display made by the first display section 32a and the mark display made by the second display section 32b may have mutually different shapes.

In the present embodiment, alternately arranging the first portion 30a and the second portion 30b in the Y-direction as in FIG. 6 can make two or more kinds of information displays concerning the same or overlapping regions. A variety of information can be displayed correspondingly to a prescribed region of the finder, e.g. the first display sections 32a are displayed when the light is focalized in a relatively narrow spot, and the second display sections 32b are displayed when the light is focalized in a relatively broad area.

Further, the first light source 22a and the second light source 22b used in this embodiment may be light sources with mutually different wavelengths (colors). For example, the first light source 22a may be a red light source that generates the first illumination light L0a with a wavelength on the order of 700 nm, and the second light source 22b may be a blue light source that generates the second illumination light L0b with a wavelength on the order of 400 nm.

In a case of arranging light sources of mutually different colors, it is configured such that the refractive index grating formed in the first display section 32a only diffracts the first illumination light L0a and the refractive index grating formed in the second display section 32b only diffracts the second illumination light L0b. The display sections 32a, 32b can be formed in such a manner that, for example, the interference fringes shown in FIG. 4 are adjusted and the repeated pitch intervals of the multi-layered laminating configuration formed of the refractive index isotropic regions 40 and the refractive index anisotropic regions 42 are varied between the first display section 32a and the second display section 32b.

As thus described, corresponding the diffraction condition in each of the display sections 32a, 32b to either the first illumination light L0a or the second illumination light L0b can make a mark corresponding to the first portion 30a display in red, and make a mark corresponding to the second portion 30b display in blue.

In this manner, the information displays within the finder scope can be made with the shapes or the colors of the mark displays varied in this embodiment, thereby enabling information displays easily identifiable by the photographer. Further, since the first illumination light L0a from the first light source 22a and the second illumination light L0b from the second light source are entered into the diffractive optical element 21 from mutually different directions, non-uniformity of luminance of mark displays corresponding to the respective display sections 32a, 32b can be suppressed.

Other Embodiments

In other embodiments, another optical filter made up of a hologram dispersion plate may be arranged between the polarization plate 60 and the element 21. As the light sources 22a, 22b, LED is used, for example, and when the LED is used, light is emitted at an angle on the order of ±30 to 40 degrees. As opposed to this, changing angles of light rays to larger angles by means of the hologram dispersion plate can reflect all light entered into the element 21 on longitudinal side surfaces 21c, 21d of the element 21 in FIG. 3.

This results in facilitation to uniformly pervade the illumination light over all regions of the element 21, thus allowing the display sections 32a, 32b to make displays in a further uniform manner. It is to be noted that the degree of dispersion (degree of change in angle) by means of the hologram dispersion plate is set to an optimum value by considering an arrangement and a size of the element 21, all reflection angles, and the like.

It should be noted that in the foregoing embodiment, in the state where a voltage has not been applied, it is configured that a difference in refractive index is generated between the liquid crystal and the polymer to lead diffraction of light, and the orientation of the liquid crystal changes at the time of the voltage application, to equalize the refractive index of the liquid crystal and the refractive index of the polymer. However, the orientation of the liquid crystal is not restricted to this, and it may be configured such that in the state where a voltage has not been applied, the refractive index of the liquid crystal is equivalent to the refractive index of the polymer, and at the time of the voltage application, the orientation of the liquid crystal changes, and a difference in refractive index is generated between the liquid crystal and the polymer to lead diffraction of light.

Further, the diffractive optical element 21 according to the foregoing embodiment has a configuration capable of turning on and off the voltage application of the transparent electrodes 36, 38 so as to turn on and off a display, but the element 21 may be a diffractive display device having no transparent electrode.

Namely, in a case of omitting the transparent electrodes 36, 38 in the element 21 of FIG. 4, the orientation states of the liquid crystal molecules within the refractive index anisotropic region 42 are the same as in the case of turning off the application voltage to the transparent electrode 36, 38, and hence the diffraction function is constantly generated. Therefore, the display sections 32a, 32b are displayed so long as the light sources 22a, 22b are in the on-states. Further, on-off control of the display sections 32a, 32b can be performed by turning on and off the light sources 22a, 22b.

Further, the shape of each of marks in the first display sections 32a and the second display sections 32b seen from the screen side are not particularly limited, and not only the C-type shape as shown in FIG. 3, but a variety of shapes, such as a ring shape or other figure shapes, a letter shape and a graphic shape, are adoptable. Further, the first display section 32a and the second display section 32b seen from the screen side may be not only still pictures, but may also be moving pictures. In order to create a moving picture, the display sections 32a, 32b are arranged in each pixel, and patterning of the first transparent electrode 36 and/or 38 may be devised so that the voltage application control can be performed in each pixel.

Further, in the present embodiment, as information to be displayed within the finder scope by hologram displays of the display sections 32a, 32b can be not only marks of focus detection areas, but a variety of displays such as exposure time and an aperture value of the lens.

Further, in the present embodiment, the colors to be displayed by hologram displays of the display sections 32a, 32b may be not only mono-color, but may also be multi-color. In order to realize multi-color, a means of laminating the element 21 corresponding to three primary colors of light (RGB) in three layers or the like can be considered.

Further, in the present embodiment, the light sources 22a, 22b can be arranged not only in two places which are the side surfaces 21a, 21b opposed to the element 21, but in a variety of positions. For example, the light sources may be arranged on the adjacent side surfaces 21a, 21c or 21b, 21d. Alternatively, the light sources may be arranged on four side surfaces 21a, 21b, 21c, and 21d. In such cases, the optical material layer 26 is divided in a number corresponding to the number of light sources.

Further, although the case is described in the present embodiment where the diffractive display device is used for the diffractive optical element within the finder of the camera, it may be mounted in a variety of optical devices other than the camera. Moreover, the diffractive display device according to the present embodiment may be applied to a compact camera as well as a single lens reflex camera.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A diffractive display device, comprising:
   a first substrate;
   a second substrate;
   first illuminating means for entering light through a first side surface of the first and second substrates;
   second illuminating means for entering light through a second side surface of the first and second substrates from a direction different from the light from the first illuminating means; and
   an optical material layer provided between the first and second substrates, the optical material layer comprising:
      a first portion provided to diffract the light from the first illuminating means to emit the light through an output surface of the first substrate, the first portion comprising:
         a first diffraction display section in which first refractive index isotropic regions and first refractive index anisotropic regions are inclined with respect to the output surface of the first substrate to diffract only the light from the first illuminating means; and
      a second portion provided to diffract the light from the second illuminating means to emit the light through the output surface of the first substrate, the second portion comprising:
         a second diffraction display section in which second refractive index isotropic regions and second refractive index anisotropic regions are inclined with respect to the output surface of the first substrate to diffract only the light from the second illuminating means.

2. The diffractive display device according to claim 1, wherein
   the first refractive index isotropic regions and the first refractive index anisotropic regions are inclined to be gradually closer to the first illuminating means from the first substrate to the second substrate.

3. The diffractive display device according to claim 2, wherein
   the second refractive index isotropic regions and the second refractive index anisotropic regions are inclined to be gradually closer to the second illuminating means from the first substrate to the second substrate.

4. The diffractive display device according to claim 1, wherein
   the first refractive index isotropic regions and the first refractive index anisotropic regions are alternately arranged in a direction along the output surface of the first substrate,
   each of the first refractive index isotropic regions is made up of a refractive index isotropic material,
   each of the first refractive index anisotropic regions includes refractive index anisotropic liquid crystal, and
   the first portion further comprises a first non-display section provided on a periphery of the first diffraction display section and formed of a mixed material of the liquid crystal and the refractive index isotropic material.

5. The diffractive display device according to claim 1, wherein
   the second refractive index isotropic regions and the second refractive index anisotropic regions are alternately arranged in the direction along the output surface of the first substrate,
   each of the second refractive index isotropic regions is made up of a refractive index isotropic material,
   each of the second refractive index anisotropic regions includes refractive index anisotropic liquid crystal, and
   the second portion further comprises a second non-display section provided on a periphery of the second diffraction display section and formed of a mixed material of the liquid crystal and the refractive index isotropic material.

6. A finder device, wherein a diffractive display device according to claim 1 is arranged within a finder of a camera, and object light transmitted through an inside of the finder is configured to be transmitted through the diffractive display device.

7. A camera having a finder device according to claim 6.

8. A diffractive display device, comprising:
   a first substrate;
   a second substrate;
   a first light source configured to emit light through a first side surface of the first and second substrates;
   a second light source configured to emit light through a second side surface of the first and second substrates from a direction different from the light from the first light source; and
   an optical material layer provided between the first and second substrates, the optical material layer comprising:

a first portion provided to diffract the light from the first light source to emit the light through an output surface of the first substrate, the first portion comprising:
  a first diffraction display section in which first refractive index isotropic regions and first refractive index anisotropic regions are inclined with respect to the output surface of the first substrate to diffract only the light from the first light source; and
a second portion provided to diffract the light from the second light source to emit the light through the output surface of the first substrate, the second portion comprising:
  a second diffraction display section in which second refractive index isotropic regions and second refractive index anisotropic regions are inclined with respect to the output surface of the first substrate to diffract only the light from the second light source.

9. The diffractive display device according to claim 8, wherein
the first refractive index isotropic regions and the first refractive index anisotropic regions are inclined to be gradually closer to the first light source from the first substrate to the second substrate.

10. The diffractive display device according to claim 9, wherein
the second refractive index isotropic regions and the second refractive index anisotropic regions are inclined to be gradually closer to the second light source from the first substrate to the second substrate.

11. The diffractive display device according to claim 8, wherein
the first refractive index isotropic regions and the first refractive index anisotropic regions are alternately arranged in a direction along the output surface of the first substrate,
each of the first refractive index isotropic regions is made up of a refractive index isotropic material,
each of the first refractive index anisotropic regions includes refractive index anisotropic liquid crystal, and
the first portion further comprises a first non-display section provided on a periphery of the first diffraction display section and formed of a mixed material of the liquid crystal and the refractive index isotropic material.

12. The diffractive display device according to claim 8, wherein
the second refractive index isotropic regions and the second refractive index anisotropic regions are alternately arranged in the direction along the output surface of the first substrate,
each of the second refractive index isotropic regions is made up of a refractive index isotropic material,
each of the second refractive index anisotropic regions includes refractive index anisotropic liquid crystal, and
the second portion further comprises a second non-display section provided on a periphery of the second diffraction display section and formed of a mixed material of the liquid crystal and the refractive index isotropic material.

13. A finder device, wherein a diffractive display device according to claim 8 is arranged within a finder of a camera, and object light transmitted through an inside of the finder is configured to be transmitted through the diffractive display device.

14. A camera having a finder device according to claim 13.

15. A diffractive display device, comprising:
a first substrate;
a second substrate;
first illuminating means for entering light through a first side surface of the first and second substrates;
second illuminating means for entering light through a second side surface of the first and second substrates from a direction different from the light from the first illuminating means; and
an optical material layer provided between the first and second substrates, the optical material layer comprising:
  a first portion provided to diffract the light from the first illuminating means to emit the light through an output surface of the first substrate, the first portion comprising:
    a first diffraction display section in which first refractive index isotropic regions and first refractive index anisotropic regions are inclined with respect to the output surface of the first substrate; and
  a second portion provided to diffract the light from the second illuminating means to emit the light through the output surface of the first substrate, the second portion comprising:
    a second diffraction display section in which second refractive index isotropic regions and second refractive index anisotropic regions are inclined with respect to the output surface of the first substrate,
wherein the first refractive index isotropic regions and the first refractive index anisotropic regions are inclined to be gradually closer to the first illuminating means from the first substrate to the second substrate, and
wherein the second refractive index isotropic regions and the second refractive index anisotropic regions are inclined to be gradually closer to the second illuminating means from the first substrate to the second substrate.

16. The diffractive display device according to claim 15, wherein
the first refractive index isotropic regions and the first refractive index anisotropic regions are alternately arranged in a direction along the output surface of the first substrate,
each of the first refractive index isotropic regions is made up of a refractive index isotropic material,
each of the first refractive index anisotropic regions includes refractive index anisotropic liquid crystal, and
the first portion further comprises a first non-display section provided on a periphery of the first diffraction display section and formed of a mixed material of the liquid crystal and the refractive index isotropic material.

17. The diffractive display device according to claim 15, wherein
the second refractive index isotropic regions and the second refractive index anisotropic regions are alternately arranged in the direction along the output surface of the first substrate,
each of the second refractive index isotropic regions is made up of a refractive index isotropic material,
each of the second refractive index anisotropic regions includes refractive index anisotropic liquid crystal, and
the second portion further comprises a second non-display section provided on a periphery of the second diffraction display section and formed of a mixed material of the liquid crystal and the refractive index isotropic material.

18. A diffractive display device, comprising:
a first substrate;
a second substrate;
a first light source configured to emit light through a first side surface of the first and second substrates;

a second light source configured to emit light through a second side surface of the first and second substrates from a direction different from the light from the first light source; and an optical material layer provided between the first and second substrates, the optical material layer comprising:
- a first portion provided to diffract the light from the first light source to emit the light through an output surface of the first substrate, the first portion comprising:
  - a first diffraction display section in which first refractive index isotropic regions and first refractive index anisotropic regions are inclined with respect to the output surface of the first substrate; and
- a second portion provided to diffract the light from the second light source to emit the light through the output surface of the first substrate, the second portion comprising:
- a second diffraction display section in which second refractive index isotropic regions and second refractive index anisotropic regions are inclined with respect to the output surface of the first substrate, wherein the first refractive index isotropic regions and the first refractive index anisotropic regions are inclined to be gradually closer to the first light source from the first substrate to the second substrate, and wherein the second refractive index isotropic regions and the second refractive index anisotropic regions are inclined to be gradually closer to the second light source from the first substrate to the second substrate.

19. The diffractive display device according to claim 18, wherein
the first refractive index isotropic regions and the first refractive index anisotropic regions are alternately arranged in a direction along the output surface of the first substrate,
each of the first refractive index isotropic regions is made up of a refractive index isotropic material,
each of the first refractive index anisotropic regions includes refractive index anisotropic liquid crystal, and
the first portion further comprises a first non-display section provided on a periphery of the first diffraction display section and formed of a mixed material of the liquid crystal and the refractive index isotropic material.

20. The diffractive display device according to claim 18, wherein
the second refractive index isotropic regions and the second refractive index anisotropic regions are alternately arranged in the direction along the output surface of the first substrate, each of the second refractive index isotropic regions is made up of a refractive index isotropic material,
each of the second refractive index anisotropic regions includes refractive index anisotropic liquid crystal, and
the second portion further comprises a second non-display section provided on a periphery of the second diffraction display section and formed of a mixed material of the liquid crystal and the refractive index isotropic material.

* * * * *